United States Patent
Aronowitz et al.

(10) Patent No.: US 12,555,042 B2
(45) Date of Patent: Feb. 17, 2026

(54) SELF-SUPERVISED LEARNING OF A TASK WITH NORMALIZATION OF NUISANCE FROM A DIFFERENT TASK

(71) Applicant: International Business Machines Corporation, Armonk, NY (US)

(72) Inventors: Hagai Aronowitz, Modiin (IL); Itai Gat, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 18/074,536

(22) Filed: Dec. 5, 2022

(65) Prior Publication Data

US 2024/0185120 A1 Jun. 6, 2024

(51) Int. Cl.
*G06N 20/00* (2019.01)

(52) U.S. Cl.
CPC .................... *G06N 20/00* (2019.01)

(58) Field of Classification Search
None
See application file for complete search history.

(56) References Cited

U.S. PATENT DOCUMENTS

| 11,586,849 | B2 * | 2/2023 | Zhang | ............ G06N 5/01 |
| 2018/0082172 | A1 | 3/2018 | Patel | |
| 2021/0406741 | A1 | 12/2021 | Poon | |

OTHER PUBLICATIONS

Gat et al., Speaker Normalization for Self-Supervised Speech Emotion Recognition; 2202.01252v2 [cs.LG] Nov. 6, 2022; Total pp. 5 (Year: 2022).*
Ramapuram et al., Evaluating the fairness of fine-tuning strategies in self-supervised learning; arXiv:2110.00538v1 [cs.LG] Oct. 1, 2021; Total pp. 5 (Year: 2021).*
Mehrabi et al., A Survey on Bias and Fairness in Machine Learning; ACM Computing Surveys, vol. 54, No. 6, Article 115. Publication date: Jul. 2021; Total pp. 35 (Year: 2021).*
Aaron van den Oord et al, "Representation learning with contrastive predictive coding," Online at: arXiv:1807.03748,Jul. 10, 2018.
Alexander H Liu et al, "Non-autoregressive predictive coding for learning speech representations from local dependencies," Online at: arXiv:2011.00406, Nov. 1, 2020.
Alexei Baevski et al, "wav2vec 2.0: A framework for self-supervised learning of speech representations," Online at: arXiv:2006.11477, Oct. 22, 2020.

(Continued)

*Primary Examiner* — Alan Chen
(74) *Attorney, Agent, or Firm* — Teddi E. Maranzano (57) ABSTRACT

A computer-implemented method including: obtaining a pre-trained upstream machine learning model; fine-tuning the pre-trained upstream model for at least two downstream tasks, wherein the fine-tuning comprises: (a) training a target downstream model for a target downstream task, based on a dataset with labeling specific to the target downstream task, and (b) training a nuisance downstream model for a nuisance downstream task, based on a dataset with labeling of characteristics which are specific to the nuisance downstream task and are undesired for the target downstream task; and normalizing the undesired characteristics from the pre-trained upstream model, to prevent biasing of the target downstream model by the undesired characteristics.

18 Claims, 4 Drawing Sheets

(56) References Cited

OTHER PUBLICATIONS

Andy T Liu et al, "Mockingjay: Unsupervised speech representation learning with deep bidirectional transformer encoders," ICASSP 2020—2020 IEEE International Conference on Acoustics, Speech and Signal Processing (ICASSP); Feb. 2, 2020.

Andy T Liu et al, "Tera: Self-supervised learning of transformer encoder representation for speech," in IEEE/ACM Transactions on Audio, Speech, and Language Processing, vol. 29, pp. 2351-2366, Jul. 29, 2020.

Arsha Nagrani et al, "Disentangled speech embeddings using cross-modal self-supervision," CASSP 2020—2020 IEEE International Conference on Acoustics, Speech and Signal Processing (ICASSP), 2020, pp. 6829-6833, May 4-8, 2020.

Arsha Nagrani et al, "Voxceleb: a large-scale speaker identification dataset," in Interspeech 2017, Aug. 20-24, 2017.

Asif Jalal et al., "Removing bias with residual mixture of multi-view attention for speech emotion recognition," in Interspeech, 2020, Oct. 2020.

Bogdan Vlasenko et al, "Combining frame and turn-level information for robust recognition of emotions within speech," Interspeech 2007, 8th Annual Conference of the International Speech Communication Association, Antwerp, Belgium, Aug. 27-31, 2007.

Carlos Busso et al, "Iemocap: Interactive emotional dyadic motion capture database," Language resources and evaluation, Oct. 15, 2007.

Clément Le Moine et al, "Speaker attentive speech emotion recognition," Online at: arXiv:2104.07288 Apr. 15, 2021.

George Trigeorgis et al, "Adieu features? end-to-end speech emotion recognition using a deep convolutional recurrent network," 2016 IEEE International Conference on Acoustics, Speech and Signal Processing (ICASSP), Mar. 2016.

Gil Keren et al, "Convolutional RNN: An enhanced model for extracting features from sequential data," Online at: https://arxiv.org/pdf/1602.05875.pdf, Jul. 20, 2017.

Guang Shen et al., "WISE: Word-Level Interaction-Based Multimodal Fusion for Speech Emotion Recognition," in Interspeech 2020, Oct. 25-29, 2020.

Itai Gat et al, "Speaker Normalization for Self-supervised Speech Emotion Recognition," Online at: https://arxiv.org/abs/2202.01252v1, arXiv:2202.01252 [cs.LG], Feb. 2, 2022.

Jianyou Wang et al., "Speech emotion recognition with dual-sequence lstm architecture," ICASSP 2020—2020 IEEE International Conference on Acoustics, Speech and Signal Processing (ICASSP), 2020, pp. 6474-6478, May 4-8, 2020.

Leonardo Pepino et al., "Emotion Recognition from Speech Using wav2vec 2.0 Embeddings," in Interspeech 2021, Aug. 2021.

Mingyi Chen et al, "3-d convolutional recurrent neural networks with attention model for speech emotion recognition," in IEEE Signal Processing Letters, vol. 25, No. 10, pp. 1440-1444, Oct. 2018.

Morgane Riviere et al, "Unsupervised pretraining transfers well across languages," Online at: arXiv:2002.02848, Feb. 7, 2020.

Pengcheng Li et al., "An Attention Pooling Based Representation Learning Method for Speech Emotion Recognition," in Interspeech 2018, Sep. 2-6, 2018.

Seunghyun Yoon et al., "Multimodal speech emotion recognition using audio and text," IEEE SLT Dec. 2018.

Seyedmahdad Mirsamadi et al, "Automatic speech emotion recognition using recurrent neural networks with local attention," 2017 IEEE International Conference on Acoustics, Speech and Signal Processing (ICASSP), 2017, pp. 2227-2231, Mar. 5-9, 2017.

Shulei Wang, "Self-Supervised Metric Learning in Multi-View Data: A Downstream Task Perspective"; Online at: arXiv:2106.07138v2 [stat.ML], Nov. 4, 2021.

Shu-wen Yang et al., "Superb: Speech processing universal performance benchmark," Online at: arXiv:2105.01051, Oct. 15, 2021.

Steffen Schneider et al, "wav2vec: Unsupervised pre-training for speech recognition," Online at: arXiv:1904.05862, Sep. 11, 2019.

Steven R. Livingstone et al, "The ryerson audio-visual database of emotional speech and song (ravdess): A dynamic, multimodal set of facial and vocal expressions in north american english," PLOS One, May 16, 2018.

Vassil Panayotov et al, "Librispeech: An ASR corpus based on public domain audio books," 2015 IEEE International Conference on Acoustics, Speech and Signal Processing (ICASSP), 2015, pp. 5206-5210.

Wei-Ning Hsu et al, "Hubert: Self-supervised speech representation learning by masked prediction of hidden units," Online at: arXiv:2106.07447, Jun. 14, 2021.

Xinyue Wei et al, "Nuisance-Label Supervision: Robustness Improvement by Free Labels"; Online at: arXiv:2110.07118, Oct. 14, 2021.

Yaroslav Ganin et al, "Unsupervised domain adaptation by backpropagation," Online at: https://arxiv.org/pdf/1409.7495.pdf, Feb. 27, 2015.

Yu-An Chung et al, "An unsupervised autoregressive model for speech representation learning," Online at: arXiv:1904.03240, Jun. 19, 2019.

Yu-An Chung et al, "Vector-quantized autoregressive predictive coding," Online at: arXiv:2005.08392, May 17, 2020.

Yuanchao Li et al, "Improved end-to-end speech emotion recognition using self attention mechanism and multitask learning," Proc. Interspeech 2019, 2803-2807, Sep. 2019.

Ziping Zhao et al., "Attention-Enhanced Connectionist Temporal Classification for Discrete Speech Emotion Recognition," in Interspeech, 2019, Sep. 15-19, 2019.

\* cited by examiner

SELF-SUPERVISED LEARNING OF A TASK WITH NORMALIZATION OF NUISANCE FROM A DIFFERENT TASK

BACKGROUND

The invention relates to the field of machine learning.

Significant advances in machine learning over the last decade can be attributed to the availability of large general-purpose and task-specific labeled datasets, and to improvements in computational performance (e.g., better hardware, such as stronger Graphical Processing Units, GPUs).

Self-supervised learning (SSL), a machine learning approach often seen as lying on the spectrum between supervised and unsupervised learning, is especially suited for cases where no large, labeled datasets are available. Self-supervised learning involves learning in two steps, often referred to as 'upstream' and 'downstream': First, a 'pretext task' of training a pretext model based on a relatively large, general-purpose set of unlabeled data but with automatic generation of pseudo-labels, in order to initialize neural network weights and learn intermediate representations of the data. Second, learning the actual task by fine-tuning the pre-trained pretext model based on a much smaller set of task-specific, labeled data. Commonly, pre-trained pretext models are available either commercially or as open source code, so a user who needs to perform a specific task only has to execute the second step using a pre-trained model which they obtained.

Self-supervised learning is particularly useful, therefore, in cases where labeled data for a specific task is difficult to obtain, either because of the labor involved in labeling or due to human biases that preclude the possibility of accurate labeling.

In recent years, self-supervised learning has proven to be quite effective in tasks such as speech recognition, natural language processing (NLP), computer vision, and more.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a computer-implemented method comprising: obtaining a pre-trained upstream machine learning model; fine-tuning the pre-trained upstream model for at least two downstream tasks, wherein the fine-tuning comprises: (a) training a target downstream model for a target downstream task, based on a dataset with labeling specific to the target downstream task, and (b) training a nuisance downstream model for a nuisance downstream task, based on a dataset with labeling of characteristics which are specific to the nuisance downstream task and are undesired for the target downstream task; and normalizing the undesired characteristics from the pre-trained upstream model, to prevent biasing of the target downstream model by the undesired characteristics.

Another embodiment is directed to a system comprising: (a) at least one hardware processor; and (b) a non-transitory computer-readable storage medium having program code embodied therewith, the program code executable by said at least one hardware processor to: obtain a pre-trained upstream machine learning model; fine-tune the pre-trained upstream model for at least two downstream tasks, wherein the fine-tuning comprises: (i) training a target downstream model for a target downstream task, based on a dataset with labeling specific to the target downstream task, and (ii) training a nuisance downstream model for a nuisance downstream task, based on a dataset with labeling of characteristics which are specific to the nuisance downstream task and are undesired for the target downstream task; and normalize the undesired characteristics from the pre-trained upstream model, to prevent biasing of the target downstream model by the undesired characteristics.

A further embodiment is directed to a computer program product comprising a non-transitory computer-readable storage medium having program code embodied therewith, the program code executable by at least one hardware processor to: obtain a pre-trained upstream machine learning model; fine-tune the pre-trained upstream model for at least two downstream tasks, wherein the fine-tuning comprises: (i) training a target downstream model for a target downstream task, based on a dataset with labeling specific to the target downstream task, and (ii) training a nuisance downstream model for a nuisance downstream task, based on a dataset with labeling of characteristics which are specific to the nuisance downstream task and are undesired for the target downstream task; and normalize the undesired characteristics from the pre-trained upstream model, to prevent biasing of the target downstream model by the undesired characteristics.

In some embodiments, the method further comprises, or the program code is further executable for: following the normalization, using the pre-trained upstream model and the trained target downstream model to fulfill the target downstream task without bias from the undesired characteristics.

In some embodiments, the normalization comprises negating gradients of the pre-trained upstream model with respect to the nuisance downstream task.

In some embodiments, the dataset with labeling specific to the target downstream task and the dataset with labeling of characteristics which specific to the nuisance downstream task are two different datasets having different samples and different labels.

In some embodiments, the dataset with labeling specific to the target downstream task and the dataset with labeling of characteristics which specific to the nuisance downstream task share common samples but with different labels.

In some embodiments, the method further comprises, or the program code is further executable for: creating one or more neural layers between the upstream model and the target downstream model; and using the one or more neural layers to adversarially train the target downstream model so that the target downstream model learns to ignore the undesired characteristics in the nuisance downstream model.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a computer-implemented method, also embodied as a system and a computer program product, for self-supervised learning which is based on a relatively small set of labeled data, but which still manages to prevent or reduce bias from undesired characteristics existing in the data.

A conventional self-supervised learning process relies on a representation trained upstream on a large unlabeled dataset, and on a downstream target task trained on a relatively small, labeled dataset. The disclosed method may enhance the performance of the target task by using another dataset with labels which are different from the target task labels and which represent undesired characteristics that threaten to bias the downstream target task. The method may normalize these undesired characteristics from the self-supervised representation to improve performance and reduce bias of the target task.

This method may be particularly advantageous in machine learning tasks that must rely on relatively small, labeled datasets, which would naturally degrade the performance of any trained model due to undesired 'nuisance' features existing in the data and biasing the model.

For example, the disclosed method may be used for emotion recognition in speech, a machine learning task in which large, labeled datasets are hard to obtain, and small datasets often contain biased, unreliable labeling. The labeling (also 'annotation') of emotions in speech is known to be challenging, because it is often affected by the annotator's bias towards linguistic, cultural, and social characteristics evident in the recordings. For instance, an annotator may mislabel emotion due to misinterpreting the manner in which speakers of a different nationality or culture express their emotions. State-of-the-art speech emotion recognition, therefore, tends to yield biased spurious correlations between speaker characteristics and the emotional class of the recording. This, combined with the fact that many of today's speech emotion recognition datasets are relatively small, tends to limit the performance of many speech emotion recognition models.

The discussions below illustrate the disclosed method using a speech emotion recognition example, but this certainly does not mean that the method only applies to this particular task. In fact, the disclosed method may benefit many other machine learning tasks, such as natural language processing (NLP), computer vision, general-purpose classification, and others-particularly in situations where large, labeled datasets are scarce and/or when manual labeling is suspected as biased.

Figure 1:
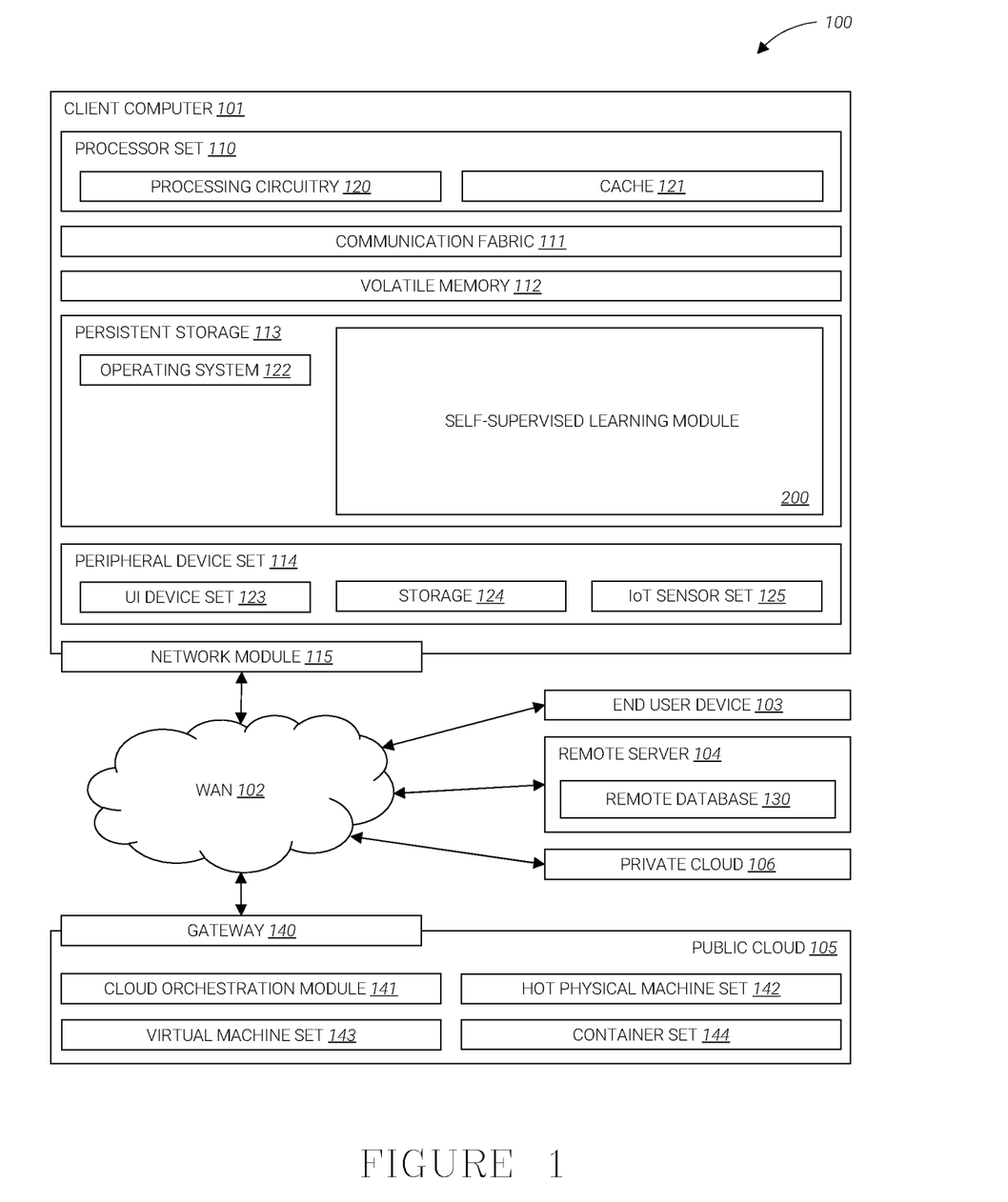
FIG. 1 is a block diagram of an exemplary computing environment for execution of self-supervised learning, according to an embodiment.

Reference is now made to FIG. 1, which shows a block diagram of an exemplary computing environment 100, containing an example of an environment for the execution of at least some of the computer code involved in performing the inventive method(s) disclosed here, such as a self-supervised learning module 200. In addition to self-supervised learning module 200, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and self-supervised learning module 200, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in self-supervised learning module 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in self-supervised learning module 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interrace controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The instructions of self-supervised learning module 200 are now discussed with reference to the flowchart of FIG. 2, which illustrates a method 202 for self-supervised learning, in accordance with an embodiment.

Steps of method 202 may either be performed in the order they are presented or in a different order (or even in parallel), as briefly mentioned above, as long as the order allows for a necessary input to a certain step to be obtained from an output of an earlier step. In addition, the steps of method 202 are performed automatically (e.g., by computer 101 of FIG. 1, or by any other applicable component of computing environment 100), unless specifically stated otherwise.

Generally, as to method 202, learning a discriminative model amounts to fitting a function $f_w: X \to Y$ from the space of data $x \in X$ to the space of labels $y \in Y$ using parameters w. The parameters of the function $f_w(x)$ are learned by fitting to training data $\{(x_1, y_1), \ldots, (x_m, y_m)\}$ using a loss function $\ell(f_w(x_i), y_i)$. Recent works in the field of self-supervised learning suggest an upstream-downstream architecture where a discriminative learner $f_w$ is composed of a pre-trained upstream learner $h_{w_1}: X \to \mathbb{R}^k$ that maps a data point to an embedding representation in $\mathbb{R}^k$. Then, a downstream learner $g_{w_2}: \mathbb{R}^k \to Y$ maps the output of $h_{w_1}$ to the label space Y. This architecture can also be viewed as a composition of $h_{w_1}$ and $g_{w_2}$, i.e., $f_w(x) = (g_{w_2} \circ h_{w_1})(x)$.

A discriminative learning algorithm searches for parameters w to best fit the relation of $(x_i, y_i)$ in the training data. However, it can sometimes unintentionally exploit undesired characteristics, or 'cues,' existing in the training data. For example, in speech emotion recognition, the goal is to encourage the learner to ignore speaker characteristics such as gender, accent (which implies nationality and/or culture), and/or any other speaker-specific features. Method 202 may therefore be seen as a technique for learning a task while normalizing cues from a different task (possibly from another dataset) in an upstream-downstream architecture.

The upstream-downstream approach allows learning more than one 'downstream' task above a single upstream model. This may be leveraged to learn an additional downstream task besides the intended (or 'target') task(s), which additional task is used for compensating against undesired cues. An example of this is solving both speaker identification and emotion recognition tasks.

In method 202, three discriminative learners may be considered. The first is an upstream model $h_w$, the second is an emotion recognition learner $g_{w_{er}}$ (the 'target' task), and the third is a speaker identification classifier $g_{w_{id}}$ (the 'nuisance' task).

In a first step 204 of method 202, the upstream machine learning model $h_w$ may be obtained, pre-trained. As an alternative, it is also possible to perform the pre-training of the upstream model in the framework of method 202. However, in most use cases, a user who wishes to perform a specific target task obtains a commercially-available or open source model which is pre-trained in a certain domain, and then employs upstream-downstream self-supervised learning to fit the model to the specific need. For example, a user may obtain a pre-trained HuBERT speech model (Wei-Ning Hsu, Benjamin Bolte, Yao-Hung Hubert Tsai, Kushal Lakhotia, Ruslan Salakhutdinov, and Abdelrahman Mohamed, "Hubert: Self-supervised speech representation learning by masked prediction of hidden units," arXiv: 2106.07447, 2021), and use it in learning to infer speaker emotion from speech samples.

Then, the pre-trained upstream model $h_w$ may be fine-tuned for at least two downstream tasks: In a step 206, the target downstream model $g_{w_{er}}$ may be trained for a target downstream task, based on a dataset with labeling specific to that target downstream task; for instance, this could be a dataset of speech in which each sample is labeled with the estimated emotion of the speaker, such as "happy," "sad," "angry," "neutral," etc. In a step 208, the nuisance downstream model $g_{w_{id}}$ may be trained for a nuisance downstream task, based on a dataset with labeling of characteristics which are specific to the nuisance downstream task and are undesired for the target downstream task; for instance, this could be a dataset of speech in which each sample is labeled with labels indicating speaker identifying characteristics such as gender, accent, nationality, etc.

Then, in a step 210, to prevent the emotion downstream task from leveraging undesired speaker characteristics (and from being biased by these characteristics), these characteristics may be normalized from the upstream representation (the trained upstream model) so that the emotion classifier is unable to leverage those cues. This may be performed by negating the gradients of the upstream model with respect to the speaker identification task. For the sake of simplicity, the normalization is described here using stochastic gradient descent (SGD), but it can readily be applied to any other type of optimizer.

In step 206, assuming gradient-based learning using the SGD algorithm, the upstream and emotion downstream weights update may be given by $$w \leftarrow w - \eta \frac{\partial \ell_{er}((g_{w_{er}} \circ h_w)(x_i), y_i)}{\partial w} \quad (1)$$

$$w_{er} \leftarrow w_{er} - \eta \frac{\partial \ell_{er}((g_{w_{er}} \circ h_w)(x_i), y_i)}{\partial w_{er}}, \quad (2)$$

where $\eta$ is a learning rate and $\ell_{er}$ is an emotion recognition loss, e.g., cross-entropy loss.

In step 210, speaker ID features may be normalized from the upstream model by $$w \leftarrow w + \lambda \frac{\partial \ell_{id}((g_{w_{id}} \circ h_w)(x_j), y_j)}{\partial w} \quad (3)$$

$$w_{id} \leftarrow w_{id} - \eta \frac{\partial \ell_{id}((g_{w_{id}} \circ h_w)(x_j), y_j)}{\partial w_{id}}, \quad (4)$$

where $\lambda$ is a hyperparameter that sets to which extent we want to normalize speaker features from the upstream model by performing a gradient ascent step on the upstream model, with respect to the speaker ID loss $\ell_{id}$.

Figure 3:
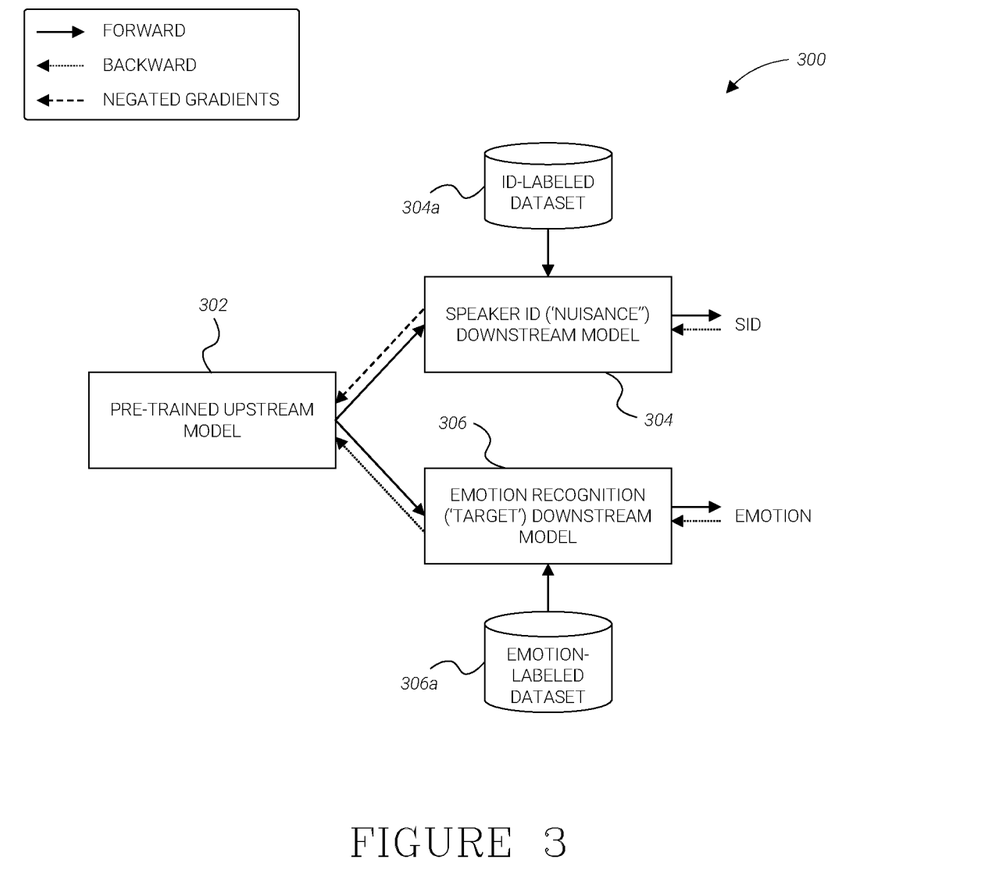
FIG. 3 is a block diagram of a self-supervised model having an upstream-downstream architecture, according to an embodiment.

Steps 204-210 are also illustrated in FIG. 3, which is a block diagram showing the forward, backward, and negated gradients flow between the upstream model 302 and downstream speaker ID 304 and emotion recognition 306 downstream models. FIG. 3 may also be referred to as an umbrella 'model' 300 having an upstream-downstream architecture. Also shown in this figure are the ID-labeled dataset 304a based on which the downstream nuisance model 304 is trained, and the emotion-labeled dataset 306a based on which the downstream target model 306 is trained.

It is important to note that the datasets of the target downstream task and the nuisance downstream task may be separate databases with different samples and different labels, or may in fact share the same samples but with different labels (such as one dataset in which the samples are labeled with emotion labels, and another in which the same samples are labeled with speaker ID labels). Both options will work.

Self-supervised learning according to method 202 may be computationally-intensive, as self-supervised upstream models often have numerous parameters. For example, in the HuBERT Large model there are 317 million parameters, and in HuBERT X-Large there are nearly a billion parameters. See Wei-Ning Hsu et al., referenced above. Thus, fine-tuning such networks can be computationally hard. Therefore, an alternative method (training strategy) may be considered, in which the number of parameters to be processed is orders of magnitude smaller.

Figure 2:
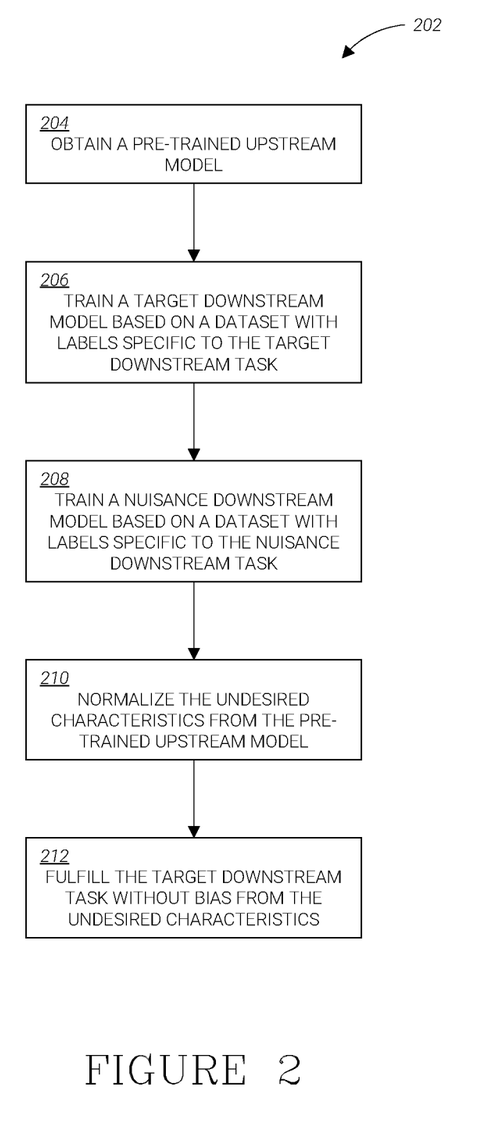
FIG. 2 is a flowchart of a method for self-supervised learning, according to an embodiment.

In the alternative method, in contrast to the method of FIG. 2, the pre-trained upstream model does not undergo any further training. Instead, a neural layer (or multiple neural layers) may be created between the upstream model and the target downstream model, whose role is to adversarially train the target downstream model so that it learns to ignore the undesired (speaker) characteristics. This may be a non-linear layer with parameters w, which is essentially used as a 'gate' between the upstream model and the target downstream model. In training the emotion recognition downstream model, w may be added to the optimization of the upstream model. However, in the training of the speaker ID downstream model, Eq. 3 may be modified to optimize solely w. In both cases, the optimization of the downstream models does not change. This allows skipping the upstream model's optimization step, which spares the gradients computation overhead in the speaker ID step.

Following the completion of either method 202 (FIG. 2) or the alternative method discussed above, the pre-trained upstream model and the trained target downstream model may be used to fulfill the target downstream task, as shown in step 212 of method 202, without bias from the undesired characteristics. Fulfillment of the target downstream task means using the models, post-normalization, to infer a class or any other prediction as to data provided as an input.

Experimental Results

This section describes experimental results of the disclosed method with the two alternative training strategies in speaker-independent and speaker-dependent settings using various training set sizes. Improvements to the state-of-the-art are shown.

The experiments were performed on the IEMOCAP dataset: Carlos Busso, Murtaza Bulut, Chi-Chun Lee, Abe Kazemzadeh, Emily Mower, Samuel Kim, Jeannette N Chang, Sungbok Lee, and Shrikanth S Narayanan, "Iemocap: Interactive emotional dyadic motion capture database," *Language resources and evaluation*, 2008. According to the traditional evaluation process, balanced classes were used: neutral, happy, sad, and angry. There are ten different speakers in the dataset (five female and five male). For the speaker identification task, the VoxCeleb dataset was used, which is annotated with 1,251 speakers and more than 100,000 utterances. See Arsha Nagrani, Joon Son Chung, and Andrew Zisserman, "Voxceleb: a large-scale speaker identification dataset," in *Interspeech*, 2017. For the upstream model, both the HuBERT base and large models were used. For the downstream model, a non-linear projection from the temporal dimension of HuBERT was used. The range of hyperparameters considered for $\lambda$ is [0.01,0.0001], although the best results were eventually obtained using $\lambda$=0.001. Accordingly, this value of $\lambda$ was used in all the experiments. For all experiments, a single NVIDIA Tesla V100 GPU was used.

Recent studies suggest various evaluation setups for emotion recognition. These setups can be divided into two categories: speaker-independent and speaker-dependent. For speaker-independent, the current experiments included five-fold cross-validation, where utterances from two speakers were used for testing and utterances from eight other speakers were used for training and validation in each fold. While the experiments focused on the speaker-independent setup, they also showed that the disclosed method improves the speaker-dependent setup where the train-test split is random and includes all speakers in both the train and test sets.

Table 1 presents the results of the disclosed method (labeled "ours") on both the speaker-independent (five-fold) and speaker-dependent (SD) setups. For speaker-independent, the second training strategy produced a state-of-the-art (SOTA) result, outperforming the current SOTA by 2.3% absolute. The improvement is consistent with both HuBERT Large and Base. Moreover, the disclosed method improves the SOTA results for speaker-dependent settings by 0.5% absolute.

For 5-fold and random train-test split (SD) settings, the table reports the weighted accuracy (WA) metric. Speaker normalization projector (SNP) and train all parameters (TAP) refers to the two training strategies described above. The disclosed method was able to outperform the current speaker-independent state-of-the-art by 2.3% and speaker-dependent state-of-the-art by 0.5%.

Additionally, the table presents the AUC for low-resource settings (further discussed below), where the disclosed method significantly enhances both the HuBERT Base and Large models.

TABLE 1

| Method | 5-fold | SD | AUC |
| --- | --- | --- | --- |
| MDRE | — | 71.8 | — |
| DS-LSTM | — | 72.7 | — |
| MOMA | — | 74.8 | — |
| WISE | 66.5 | — | — |
| wav2vec2-PT | 67.2 | — | — |
| ACTC | 69.0 | — | — |
| AttPool | 71.7 | — | — |
| HUBERT Base | 68.9 | 71.2 | 61.0 |
| HUBERT Base + Ours (SNP) | 69.0 | 72.8 | 61.6 |
| HUBERT Base + Ours (TAP) | 69.9 | 72.4 | 62.7 |
| HUBERT Large | 71.9 | 78.3 | 63.9 |
| HUBERT Large + Ours (SNP) | 73.9 | 79.9 | 64.2 |
| HUBERT Large + Ours (TAP) | 74.2 | 81.0 | 64.9 |

In the table:

MDRE refers to Seunghyun Yoon, Seokhyun Byun, and Kyomin Jung, "Multimodal speech emotion recognition using audio and text," in SLT, 2018.

DS-LSTM refers to Jianyou Wang, Michael Xue, Ryan Culhane, Enmao Diao, Jie Ding, and Vahid Tarokh, "Speech emotion recognition with dual-sequence lstm architecture," in ICASSP, 2020.

MOMA refers to Asif Jalal, Rosanna Milner, Thomas Hain, and Roger Moore, "Removing bias with residual mixture of multi-view attention for speech emotion recognition," in Interspeech, 2020.

WISE refers to Guang Shen, Riwei Lai, Rui Chen, Yu Zhang, Kejia Zhang, Qilong Han, and Hongtao Song, "WISE: Word-Level Interaction-Based Multimodal Fusion for Speech Emotion Recognition," in Interspeech, 2020.

wav2vec2-PT refers to Leonardo Pepino, Pablo Riera, and Luciana Ferrer, "Emotion Recognition from Speech Using wav2vec 2.0 Embeddings," in Interspeech, 2021.

ACTC refers to Ziping Zhao, Zhongtian Bao, Zixing Zhang, Nicholas Cummins, Haishuai Wang, and Bjorn W. Schuller, "Attention-Enhanced Connectionist Temporal Classification for Discrete Speech Emotion Recognition," in Interspeech, 2019.

AttPool refers to Pengcheng Li, Yan Song, Ian McLoughlin, Wu Guo, and Lirong Dai, "An Attention Pooling Based Representation Learning Method for Speech Emotion Recognition," in Interspeech, 2018.

HUBERT Base and Large refer to Wei-Ning Hsu et al., referenced above.

The experiments further evaluated the ability of the disclosed method to normalize speaker information from an upstream model. A classifier was trained twice on a fixed upstream (i.e., without fine-tuning the upstream model) HuBERT Large for speaker identification: First, a downstream model was trained on HuBERT before the disclosed speaker normalization method. An accuracy of 60.7% was obtained. Then, an additional speaker ID downstream model was trained on a fixed HuBERT that was trained with the disclosed method. This resulted in 45.9% accuracy. Thus, as desired, the present method harmed the speaker ID features of the upstream model.

A high-standard data collection and annotation is often an expensive process. The experiments therefore also included quantitative evaluation settings for small dataset setup.

Figure 4:
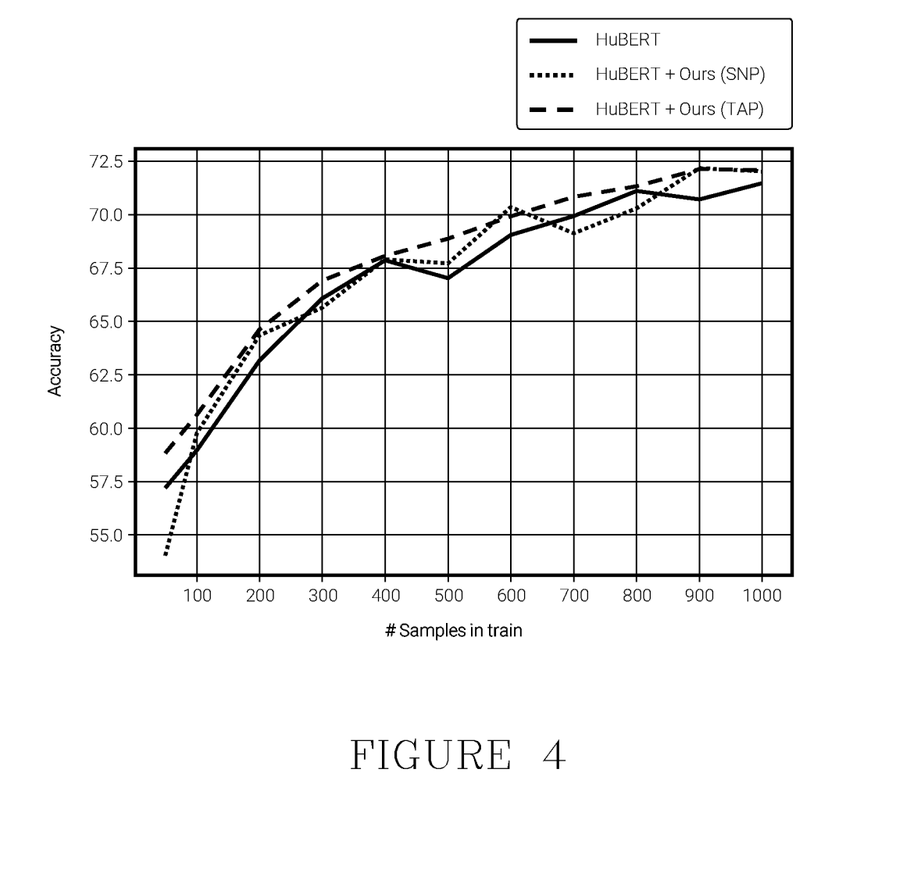
FIG. 4 is a graph of experimental results.

To test speech emotion recognition with few resources, the number of samples per class in the training set may be increased. Then, to stabilize the results, each step may be run five times with different random splits, and each step's mean may be computed. FIG. 4 presents results for this proposed low-resource setup. As can be seen, accuracy was higher for HuBERT Large model with the disclosed method than for HuBERT Large model without the disclosed method, across almost all sample sizes. The AUC of each method is reported in Table 1. It can be observed that the normalization of speaker features from the upstream representation using the disclosed method enhances the generalization capabilities of HuBERT.

Every step, parameter, technique, or other aspect of the experimental results reported above is considered a possible part of embodiments of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially." "essentially." and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
obtaining a pre-trained upstream machine learning model;
fine-tuning the pre-trained upstream model for at least two downstream tasks, wherein the fine-tuning comprises:
training a target downstream model for a target downstream task, based on a dataset with labeling specific to the target downstream task, and training a nuisance downstream model for a nuisance downstream task, based on a dataset with labeling of characteristics which are specific to the nuisance downstream task and are undesired for the target downstream task; and
normalizing the undesired characteristics from the pre-trained upstream model, to prevent biasing of the target downstream model by the undesired characteristics.

2. The method of claim 1, further comprising:
following the normalization, using the pre-trained upstream model and the trained target downstream model to fulfill the target downstream task without bias from the undesired characteristics.

3. The method of claim 1, wherein:
the normalization comprises negating gradients of the pre-trained upstream model with respect to the nuisance downstream task.

4. The method of claim 1, wherein:
the dataset with labeling specific to the target downstream task and the dataset with labeling of characteristics which specific to the nuisance downstream task are two different datasets having different samples and different labels.

5. The method of claim 1, wherein:
the dataset with labeling specific to the target downstream task and the dataset with labeling of characteristics which specific to the nuisance downstream task share common samples but with different labels.

6. The method of claim 1, further comprising:
creating one or more neural layers between the upstream model and the target downstream model; and
using the one or more neural layers to adversarially train the target downstream model so that the target downstream model learns to ignore the undesired characteristics in the nuisance downstream model.

7. A system comprising:
(a) at least one hardware processor; and
(b) a non-transitory computer-readable storage medium having program code embodied therewith, the program code executable by said at least one hardware processor to:
obtain a pre-trained upstream machine learning model,
fine-tune the pre-trained upstream model for at least two downstream tasks, wherein the fine-tuning comprises:
training a target downstream model for a target downstream task, based on a dataset with labeling specific to the target downstream task, and
training a nuisance downstream model for a nuisance downstream task, based on a dataset with labeling of characteristics which are specific to the nuisance downstream task and are undesired for the target downstream task, and
normalize the undesired characteristics from the pre-trained upstream model, to prevent biasing of the target downstream model by the undesired characteristics.

8. The system of claim 7, wherein the program code is further executable by said at least one hardware processor to:
following the normalization, using the pre-trained upstream model and the trained target downstream model to fulfill the target downstream task without bias from the undesired characteristics.

9. The system of claim 7, wherein:
the normalization comprises negating gradients of the pre-trained upstream model with respect to the nuisance downstream task.

10. The system of claim 7, wherein:
the dataset with labeling specific to the target downstream task and the dataset with labeling of characteristics which specific to the nuisance downstream task are two different datasets having different samples and different labels.

11. The system of claim 7, wherein:
the dataset with labeling specific to the target downstream task and the dataset with labeling of characteristics which specific to the nuisance downstream task share common samples but with different labels.

12. The system of claim 7, wherein the program code is further executable by said at least one hardware processor to:
creating one or more neural layers between the upstream model and the target downstream model; and
using the one or more neural layers to adversarially train the target downstream model so that the target downstream model learns to ignore the undesired characteristics in the nuisance downstream model.

13. A computer program product comprising a non-transitory computer-readable storage medium having program code embodied therewith, the program code executable by at least one hardware processor to:
obtaining a pre-trained upstream machine learning model;
fine-tuning the pre-trained upstream model for at least two downstream tasks, wherein the fine-tuning comprises:
training a target downstream model for a target downstream task, based on a dataset with labeling specific to the target downstream task, and training a nuisance downstream model for a nuisance downstream task, based on a dataset with labeling of characteristics which are specific to the nuisance downstream task and are undesired for the target downstream task; and
normalizing the undesired characteristics from the pre-trained upstream model, to prevent biasing of the target downstream model by the undesired characteristics.

14. The computer program product of claim 13, wherein the program code is further executable by the at least one hardware processor to:
following the normalization, using the pre-trained upstream model and the trained target downstream model to fulfill the target downstream task without bias from the undesired characteristics.

15. The computer program product of claim 13, wherein:
the normalization comprises negating gradients of the pre-trained upstream model with respect to the nuisance downstream task.

16. The computer program product of claim 13, wherein:
the dataset with labeling specific to the target downstream task and the dataset with labeling of characteristics which specific to the nuisance downstream task are two different datasets having different samples and different labels.

17. The computer program product of claim 13, wherein:
the dataset with labeling specific to the target downstream task and the dataset with labeling of characteristics which specific to the nuisance downstream task share common samples but with different labels.

18. The computer program product of claim 13, wherein the program code is further executable by the at least one hardware processor to:
creating one or more neural layers between the upstream model and the target downstream model; and
using the one or more neural layers to adversarially train the target downstream model so that the target downstream model learns to ignore the undesired characteristics in the nuisance downstream model.

* * * * *